United States Patent
Satyanarayana (12) 
(10) Patent No.: US 10,334,513 B2
(45) Date of Patent: Jun. 25, 2019

(54) NEIGHBOR AWARENESS NETWORK DISCOVERY

(71) Applicant: Cisco Technology, Inc., San Jose, CA (US)

(72) Inventor: Mahesh Satyanarayana, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 31 days.

(21) Appl. No.: 15/494,633

(22) Filed: Apr. 24, 2017

(65) Prior Publication Data

US 2018/0310232 A1   Oct. 25, 2018

(51) Int. Cl.
| | |
|---|---|
| *H04W 48/16* | (2009.01) |
| *H04W 48/20* | (2009.01) |
| *H04W 84/12* | (2009.01) |
| *H04W 88/08* | (2009.01) |

(52) U.S. Cl.
CPC .......... *H04W 48/16* (2013.01); *H04W 48/20* (2013.01); *H04W 84/12* (2013.01); *H04W 88/08* (2013.01)

(58) Field of Classification Search
CPC ..... H04W 48/16; H04W 48/20; H04W 88/08; H04W 84/12
See application file for complete search history.

(56) References Cited

U.S. PATENT DOCUMENTS

| | | |
|---|---|---|
| 8,478,297 B2 | 7/2013 | Morgan et al. |
| 8,982,785 B2 | 3/2015 | Pandey et al. |
| 2014/0256317 A1 | 9/2014 | Zhao et al. |
| 2015/0156709 A1 | 6/2015 | Shukla et al. |

FOREIGN PATENT DOCUMENTS

WO   WO-2015152657 A1   10/2015

*Primary Examiner* — Jackie Zuniga Abad
(74) *Attorney, Agent, or Firm* — Behmke Innovation Group LLC; James Behmke; Stephen D. LeBarron (57) ABSTRACT

In one embodiment, a networking device in a network forms a Wi-Fi association with a node on a first wireless channel. The networking device preforms a passive scan of Wi-Fi Neighbor Awareness Network (NAN) channels and receives a NAN discovery beacon from a NAN via a particular one of the NAN channels during the passive scan. The networking device generates a NAN cluster discovery attribute for the NAN based on the received NAN discovery beacon, and sends the NAN discovery attribute to the node via the first wireless channel, wherein the node uses the NAN discovery attribute to associate with the NAN.

17 Claims, 6 Drawing Sheets

NEIGHBOR AWARENESS NETWORK DISCOVERY

TECHNICAL FIELD

The present disclosure relates generally to computer networks, and, more particularly, to neighbor awareness network discovery in a computer network.

BACKGROUND

A recent evolution in the field of computer networking has focused on moving away from simply connecting traditional computers with an existing network to connecting many non-traditional devices to a network and even forming networks on the fly. Notably, the term "Internet of Things" (IoT) refers to an effort to extend networking capabilities to many non-traditional "things," such as lights, appliances, vehicles, heating, ventilating, and air-conditioning (HVAC), windows and window shades and blinds, doors, locks, etc. In addition to networking many non-traditional devices, some efforts have focused on internetworking devices on a smaller scale, such as by forming personal area networks (PANs) and neighbor awareness networks (NANs), in which only a very limited number of devices are connected to one another.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a networking device in a network forms a Wi-Fi association with a node on a first wireless channel. The networking device preforms a passive scan of Wi-Fi Neighbor Awareness Network (NAN) channels and receives a NAN discovery beacon from a NAN via a particular one of the NAN channels during the passive scan. The networking device generates a NAN cluster discovery attribute for the NAN based on the received NAN discovery beacon, and sends the NAN discovery attribute to the node via the first wireless channel, wherein the node uses the NAN discovery attribute to associate with the NAN.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others. Other types of networks, such as field area networks (FANs), neighborhood awareness networks (NANs), personal area networks (PANs), etc. may also make up the components of any given computer network.

In various embodiments, computer networks may include an Internet of Things network. Loosely, the term "Internet of Things" or "IoT" (or "Internet of Everything" or "IoE") refers to uniquely identifiable objects (things) and their virtual representations in a network-based architecture. In particular, the IoT involves the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Often, IoT networks operate within a shared-media mesh networks, such as wireless or PLC networks, etc., and are often on what is referred to as Low-Power and Lossy Networks (LLNs), which are a class of network in which both the routers and their interconnect are constrained. That is, LLN devices/routers typically operate with constraints, e.g., processing power, memory, and/or energy (battery), and their interconnects are characterized by, illustratively, high loss rates, low data rates, and/or instability. IoT networks are comprised of anything from a few dozen to thousands or even millions of devices, and support point-to-point traffic (between devices inside the network), point-to-multipoint traffic (from a central control point such as a root node to a subset of devices inside the network), and multipoint-to-point traffic (from devices inside the network towards a central control point).

Fog computing is a distributed approach of cloud implementation that acts as an intermediate layer from local networks (e.g., IoT networks) to the cloud (e.g., centralized and/or shared resources, as will be understood by those skilled in the art). That is, generally, fog computing entails using devices at the network edge to provide application services, including computation, networking, and storage, to the local nodes in the network, in contrast to cloud-based approaches that rely on remote data centers/cloud environments for the services. To this end, a fog node is a functional node that is deployed close to fog endpoints to provide computing, storage, and networking resources and services. Multiple fog nodes organized or configured together form a fog system, to implement a particular solution. Fog nodes and fog systems can have the same or complementary capabilities, in various implementations. That is, each individual fog node does not have to implement the entire spectrum of capabilities. Instead, the fog capabilities may be distributed across multiple fog nodes and systems, which may collaborate to help each other to provide the desired services. In other words, a fog system can include any number of virtualized services and/or data stores that are spread across the distributed fog nodes. This may include a master-slave configuration, publish-subscribe configuration, or peer-to-peer configuration. Fiber optical connections, as described above are often used to interconnect the distributed fog nodes.

Figure 1:
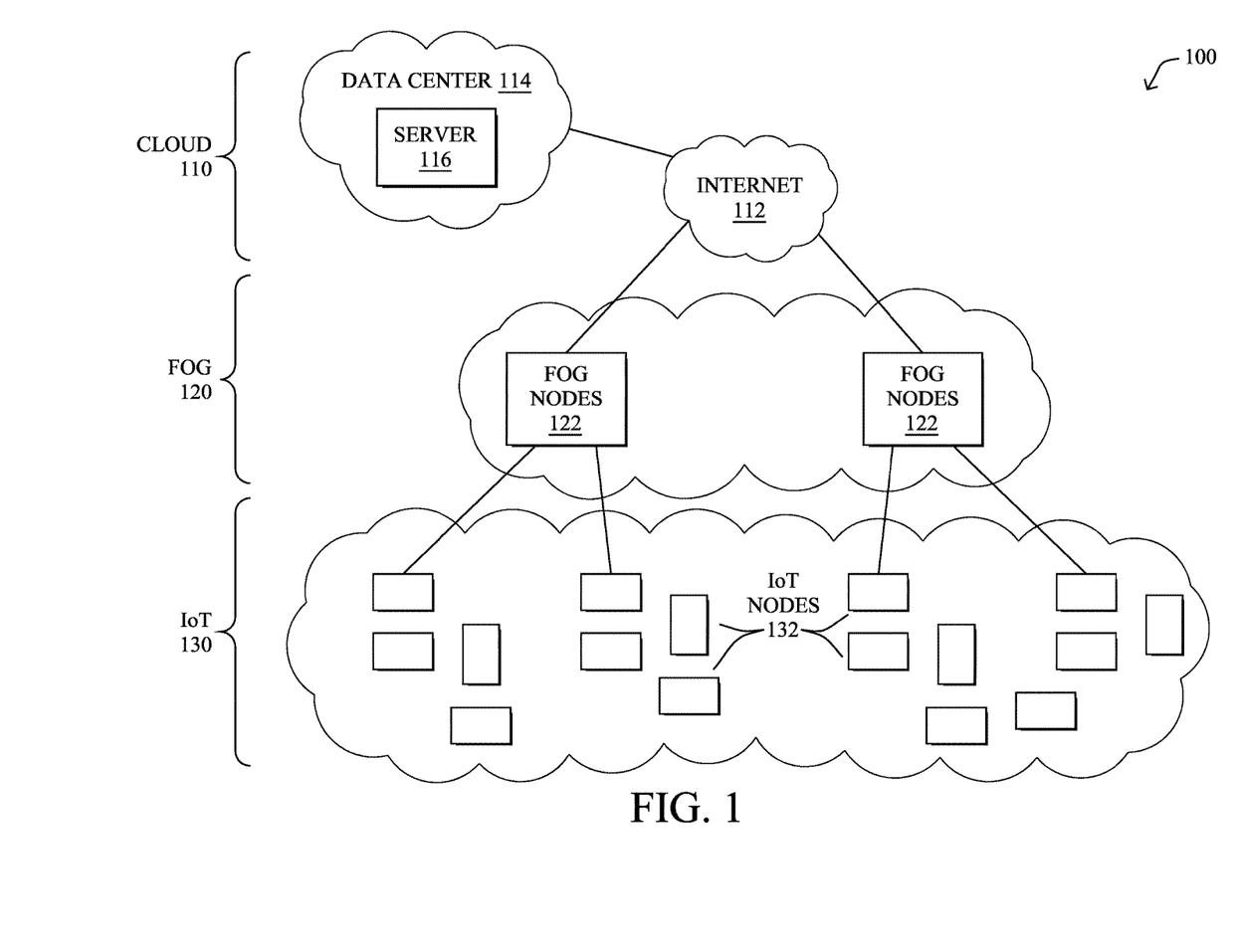
FIG. 1 illustrates an example communication network.

FIG. 1 is a schematic block diagram of an example simplified computer network 100 illustratively comprising nodes/devices at various levels of the network, interconnected by various methods of communication. For instance, the links may be wired links or shared media (e.g., wireless links, PLC links, etc.) where certain nodes, such as, e.g., routers, sensors, computers, etc., may be in communication with other devices, e.g., based on connectivity, distance, signal strength, current operational status, location, etc.

Specifically, as shown in the example network 100, three illustrative layers are shown, namely the cloud 110, fog 120, and IoT device 130. Illustratively, the cloud 110 may comprise general connectivity via the Internet 112, and may contain one or more datacenters 114 with one or more centralized servers 116 or other devices, as will be appreciated by those skilled in the art. Within the fog layer 120, various fog nodes/devices 122 (e.g., with fog modules, described below) may execute various fog computing resources on network edge devices, as opposed to datacenter/cloud-based servers or on the endpoint nodes 132 themselves of the IoT layer 130. Data packets (e.g., traffic and/or messages sent between the devices/nodes) may be exchanged among the nodes/devices of the computer network 100 using predefined network communication protocols such as certain known wired protocols, wireless protocols, PLC protocols, or other shared-media protocols where appropriate. In this context, a protocol consists of a set of rules defining how the nodes interact with each other.

Those skilled in the art will understand that any number of nodes, devices, links, etc. may be used in the computer network, and that the view shown herein is for simplicity. Also, those skilled in the art will further understand that while the network is shown in a certain orientation, the network 100 is merely an example illustration that is not meant to limit the disclosure.

Figure 2:
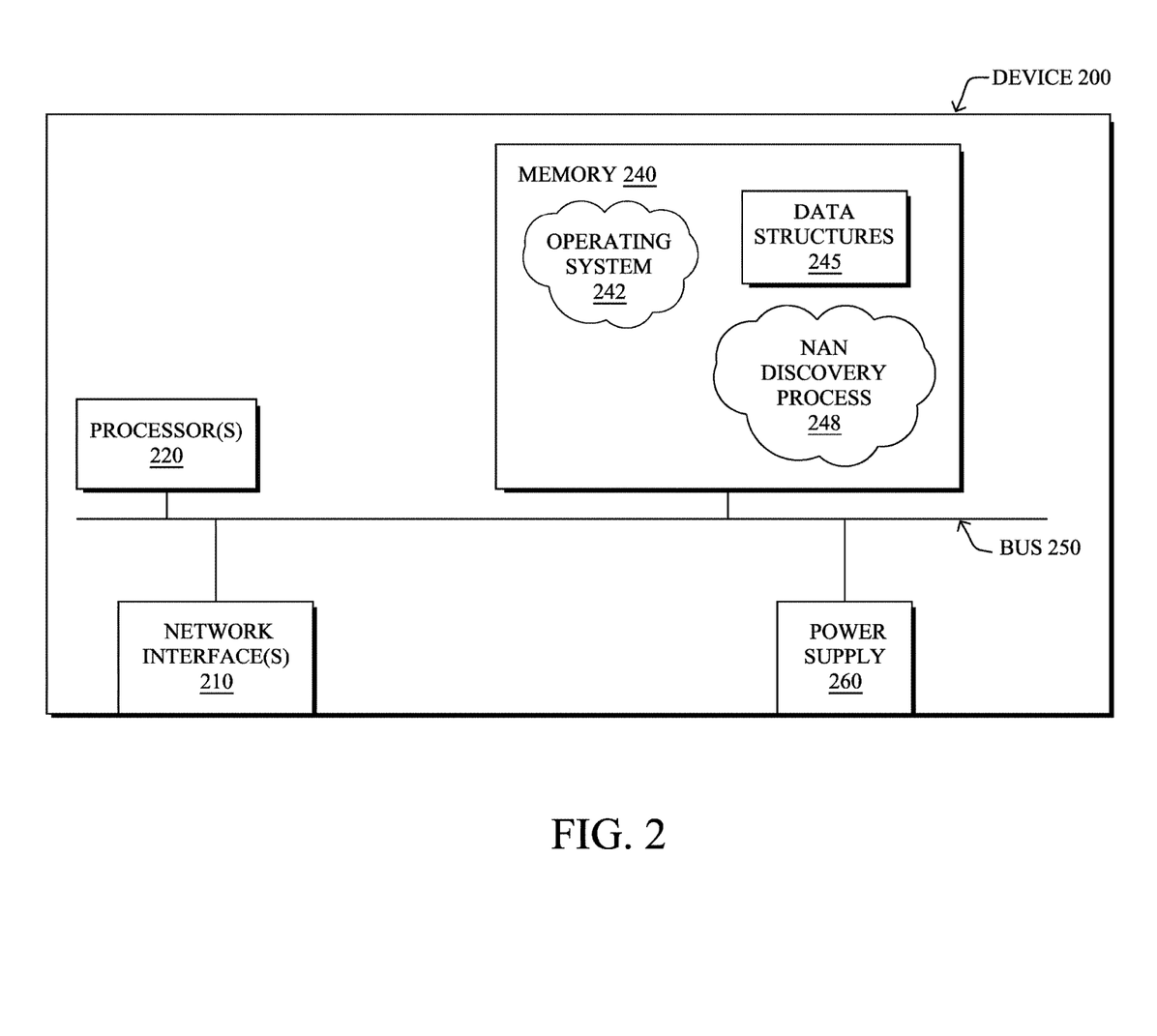
FIG. 2 illustrates an example network device/node.

FIG. 2 is a schematic block diagram of an example computing device/node 200 that may be used with one or more embodiments described herein e.g., as any of the devices shown in FIG. 1 above or any of the devices described further below. The device may comprise one or more network interfaces 210 (e.g., wired, wireless, cellular, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network 100. The network interfaces may be configured to transmit and/or receive data using a variety of different communication protocols. Note, further, that the nodes may have two or more different types of network connections 210, e.g., wireless and wired/physical connections, and that the view herein is merely for illustration. Also, while the network interface 210 is shown separately from power supply 260, for PLC communications, the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise an illustrative NAN discovery 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

As noted above, neighbor awareness networks (NANs) may be formed, to cooperatively share and communicate information between a very limited set of nearby devices. For example, a device placed inside a movie billboard may create a NAN and advertise movie show times over that network. A person standing next to this billboard may use their smartphone to discover the NAN and retrieve the advertised movie show times. In addition, smart televisions in various meeting rooms on an office floor may create a NAN cluster, and a person may use their laptop to discover and join this NAN to obtain information about all smart TVs present in their vicinity.

In contrast to other beacon or ad-hoc networking standards, NANs leverage traditional Wi-Fi capabilities of the nodes. Notably, the NAN specification defines 802.11 protocol primitives (or messages) to do the following:

a) Create and advertise a NAN network—these primitives are used by IoT devices to create a NAN.

b) Discover NAN networks in the vicinity—a connecting node, such as user equipment (UE) (e.g., smartphones, computers, etc.) may use these primitives to discover all NANs in its vicinity.

c) Join a NAN—once a node discovers a NAN, it uses these primitives to join a NAN network.

The NAN technical specification provides two methods to discover nearby NAN networks:

1.) NAN-capable device creates a NAN and periodically broadcasts a "NAN Discovery Beacon" message in a designated channel in the 2.4 GHz range (e.g., on Wi-Fi channel 6) and/or in the 5 GHz bands (e.g., Wi-Fi channels 44 and 149). A node wishing to discover a NAN does a passive scan on these channels and look for "NAN Discovery Beacon" messages. If the node finds a desired NAN, then it can join that network.

2.) If NAN-capable device is capable of transmitting regular Wi-Fi beacon and probe 802.11 messages, then it can include a "NAN cluster discovery" attribute in the Wi-Fi beacon and probe response messages. This attribute includes information about NAN ad-hoc network created by this device. A node then wishing to discover and join a NAN may perform a passive or active scan of all Wi-Fi channels in all bands and looks for this attribute in beacon or probe responses, respectively.

Thus, to join a NAN, a network node must periodically scan designated NAN channels in order to locate an available NAN or NAN cluster. However, doing so also leads to periodic disruptions in the Wi-Fi connectivity of the node as it switches radio channels. In addition, periodic or even on-demand scans for NANs would significantly impact battery life of battery powered devices.

Neighbor Awareness Network Discovery

The techniques herein make use of a networking device, such as a wireless access point (AP), to which a node may already be associated, to assist the node in quickly and easily discovering nearby NANs. Rather than relying on the node to passively or actively scan channels, causing a drain on constrained device resources, the networking device (e.g., AP) may be engaged to scan and discover available NANs to enable the node to join. In this way, the process of NAN discovery may be off-loaded from the node seeking to join the NAN (e.g., user equipment such as a smartphone) to a networking device to which it is connected. It is not necessary for the node itself to perform frequent channel scanning, thereby minimizing disruption in Wi-Fi connectivity and enhancing battery life.

Specifically, according to one or more embodiments of the disclosure as described in detail below, a networking device in a network forms a Wi-Fi association with a node on a first wireless channel. The networking device preforms a passive scan of Wi-Fi Neighbor Awareness Network (NAN) channels and receives a NAN discovery beacon from a NAN via a particular one of the NAN channels during the passive scan. The networking device generates a NAN cluster discovery attribute for the NAN based on the received NAN discovery beacon, and sends the NAN discovery attribute to the node via the first wireless channel, wherein the node uses the NAN discovery attribute to associate with the NAN.

Illustratively, the techniques described herein may be performed by hardware, software, and/or firmware, such as in accordance with NAN discovery process 248, which may include computer executable instructions executed by the processor 220 (or independent processor of interfaces 210) to perform functions relating to the techniques described herein.

Figure 3:
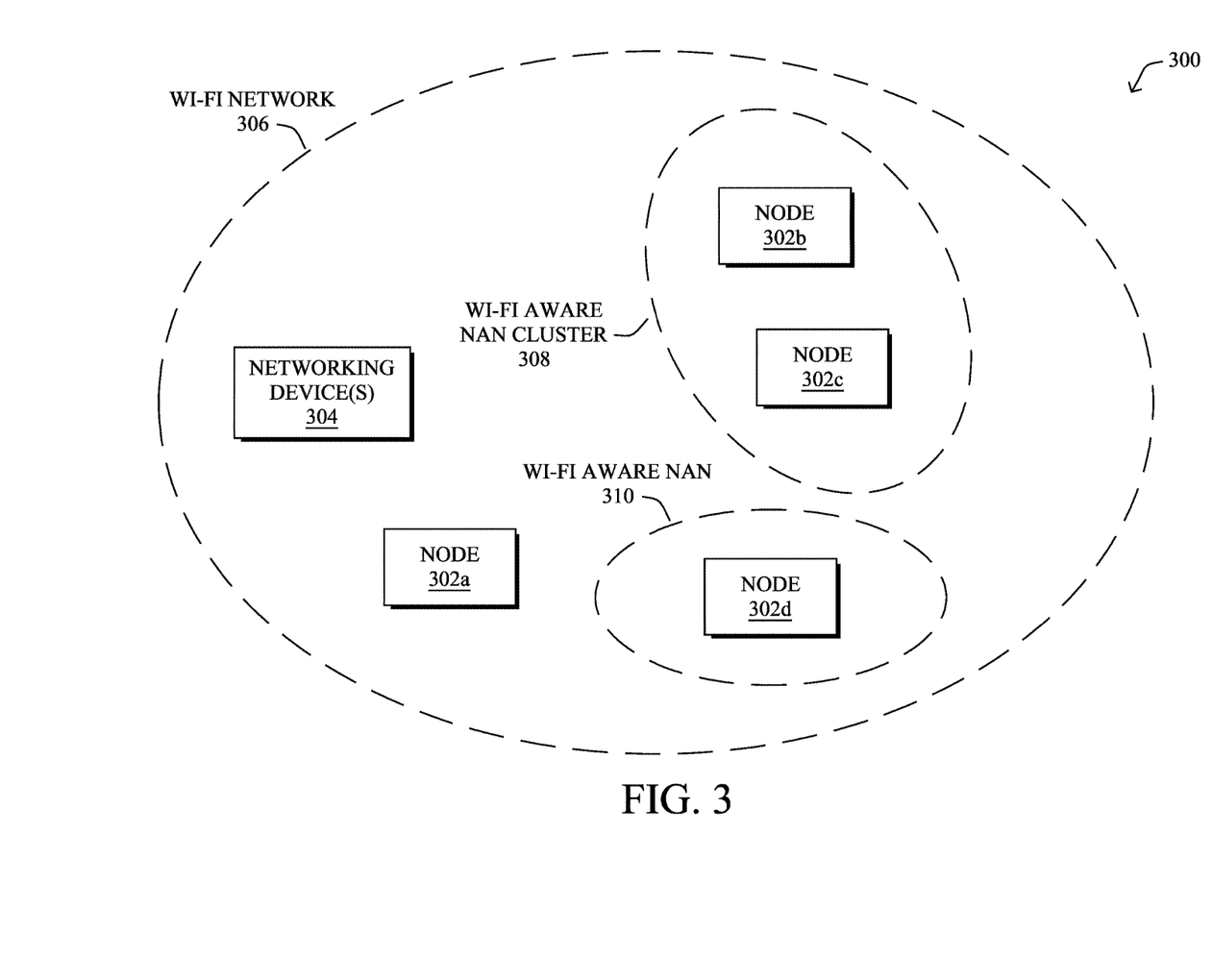
FIG. 3 illustrates example Neighbor Awareness Networks (NANs) within a Wi-Fi network.

Operationally, FIG. 3 illustrates an example network 300 that may include one or more NANs. As shown, network 300 may include Wi-Fi network 306, which itself may include one or more networking device(s) 304 (e.g., a wireless AP, etc.). The Wi-Fi network 306 may further include any number of nodes 302, such as various types of IoT devices (e.g., a smart TV, a smart refrigerator, a billboard, etc.) and user equipment (e.g., smartphones, laptops, etc.), which may be associated with the networking device(s). In other words, networking device(s) 304 may provide connectivity to the nodes 302a-302d in Wi-Fi network 306, such as by connecting a given node 302 to a LAN, WAN, or the like.

As shown in FIG. 3, one or more of the nodes may create at least one NAN. For example, node 302b may form an individual NAN (e.g., NAN 310) and nodes 302b and 302c may form a NAN cluster (e.g., NAN cluster 308). In some embodiments, discovery of a given NAN 308-310 may be performed in accordance with Wi-Fi Aware, which is a discovery approach promulgated by the Wi-Fi Alliance. Generally, Wi-Fi Aware rides on existing 2.4 GHz and 5 GHz radio and 802.11 protocols. As would be appreciated, Wi-Fi Aware operates only for purposes of service discovery (e.g., discovering the services of a NAN) and does not provide any direct connectivity between the nodes. For example, Wi-Fi Aware may be used to discover the services of a NAN and Wi-Fi Direct may be used for the actual data transfers related to the services.

Note that in FIG. 3, node 302a is not yet associated with any particular NAN and only that of Wi-Fi network 306. To do so, the node must first discover the NANs in its vicinity. However, as discussed above, scanning for nearby NANs may result in frequent radio channel switching and may have a significant impact on device battery life. Thus, in some embodiments of the present disclosure, NAN discovery may be performed by the networking device(s) 306 of Wi-Fi network 306.

Figure 4A:
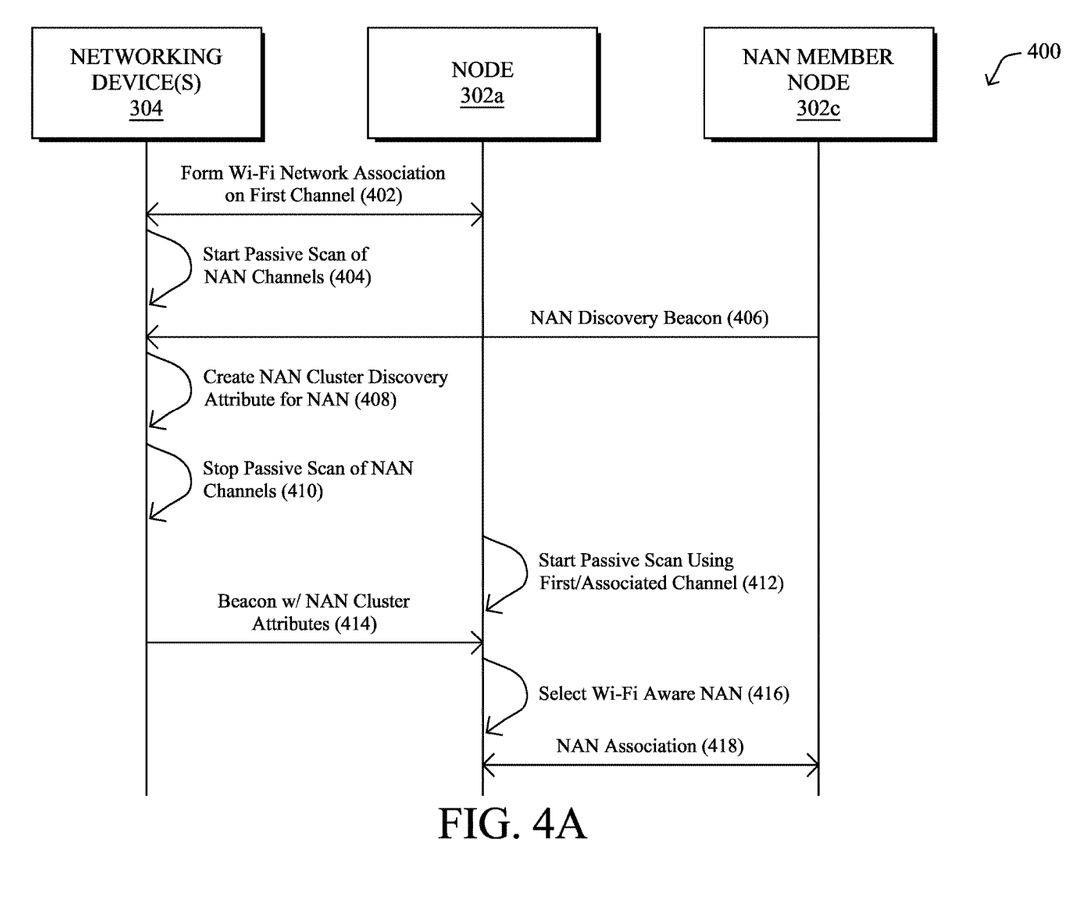
FIGS. 4A-4B illustrate example flow diagrams of the NAN discovery process.
Figure 4B:
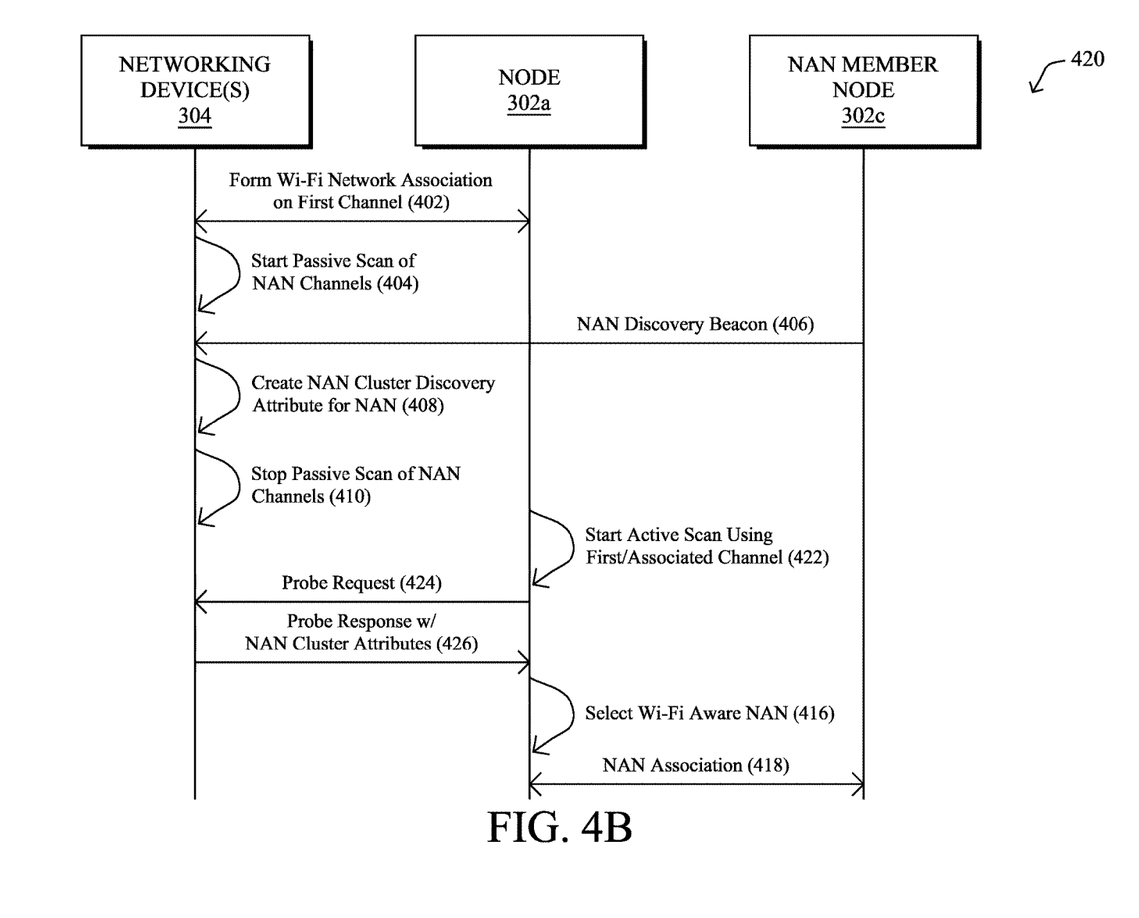

FIGS. 4A-4B illustrate examples of the NAN discovery techniques of the present disclosure. More specifically, FIG. 4A illustrates a flow diagram 400 for NAN discovery using passive scanning by a node, whereas FIG. 4B illustrates a flow diagram 420 for NAN discovery using active scanning by a node.

In both flow diagrams 400, 420 in FIGS. 4A-4B, in step 402, networking device(s) 304 (e.g., a wireless AP) in Wi-Fi network 306 may form a Wi-Fi network association with a node 302a (e.g., a smartphone or other user equipment, etc.) using a first wireless channel, which may be any channel in the Wi-Fi band that is accessible by both the node and the networking device. Once associated, in step 404, the networking device(s) may begin a scan to discover some or all of the available NANs in its vicinity. For example, as shown in flow diagram 400, networking device(s) 304 may begin a passive scan of NAN channels to discover available NANs and NAN clusters.

In some embodiments, member nodes of nearby NANs may periodically broadcast a discovery message (e.g., a NAN Discovery Beacon) on its designated Wi-Fi channel, and, in step 406, the networking device(s) may receive this message from the member node (e.g., node 302c of NAN cluster 308) during the passive scan of channels. In some embodiments, the particular channel on which the discovery message is received is different from the channel on which the node and networking device(s) are associated. For example, the NAN channel may comprise Wi-Fi channel 6 in the 2.4 GHz band or Wi-Fi channels 44 or 149 in the 5 GHz band.

Similarly, discovery messages from member nodes of other nearby NANs may also be received by networking device 304. Upon receiving the discovery messages, the networking device(s) (e.g., a wireless AP, wireless controller in communication with an AP, etc.) may create a list of all of the NANs in the vicinity. For example, in step 408, networking device(s) 304 may create a NAN cluster discovery attribute for each of the discovered NANs. Discovery attributes may include, for example, services offered by the NAN or may identify the wireless channel used by the NAN. In step 410, passive scanning may end.

Since the node (e.g., node 302a) is connected to the networking device(s), and the networking device(s) has discovered the available NANs, the node does not need to switch radio channels and perform a channel scan in order to discover and join a NAN. Instead, the node may perform a scan on the same channel used to associate with the networking device.

For example, in step 412 shown in FIG. 4A, node 302a may, in some embodiments, begin a passive scan using the first/associated channel with networking device 302 (e.g., a Wi-Fi AP), looking for a message for joining a nearby NAN. In step 414, networking device(s) 304 may send a beacon with the NAN discovery attributes to the node. In step 416, the node may select a Wi-Fi Aware NAN (e.g., NAN cluster 308) based on the received attributes and, in step 418, may join the selected NAN.

In another embodiment, as shown in FIG. 4B, the node may perform an active scan to identify a suitable NAN. For example, in step 422, node 302a may begin an active scan on the first/associated channel and, in step 424, may send a probe request to networking device(s) 304 using the channel. The networking device(s) may send a probe response that includes the NAN cluster attributes (step 426), from which node 302a may select a Wi-Fi Aware NAN (step 416) and join (step 418).

Figure 5:
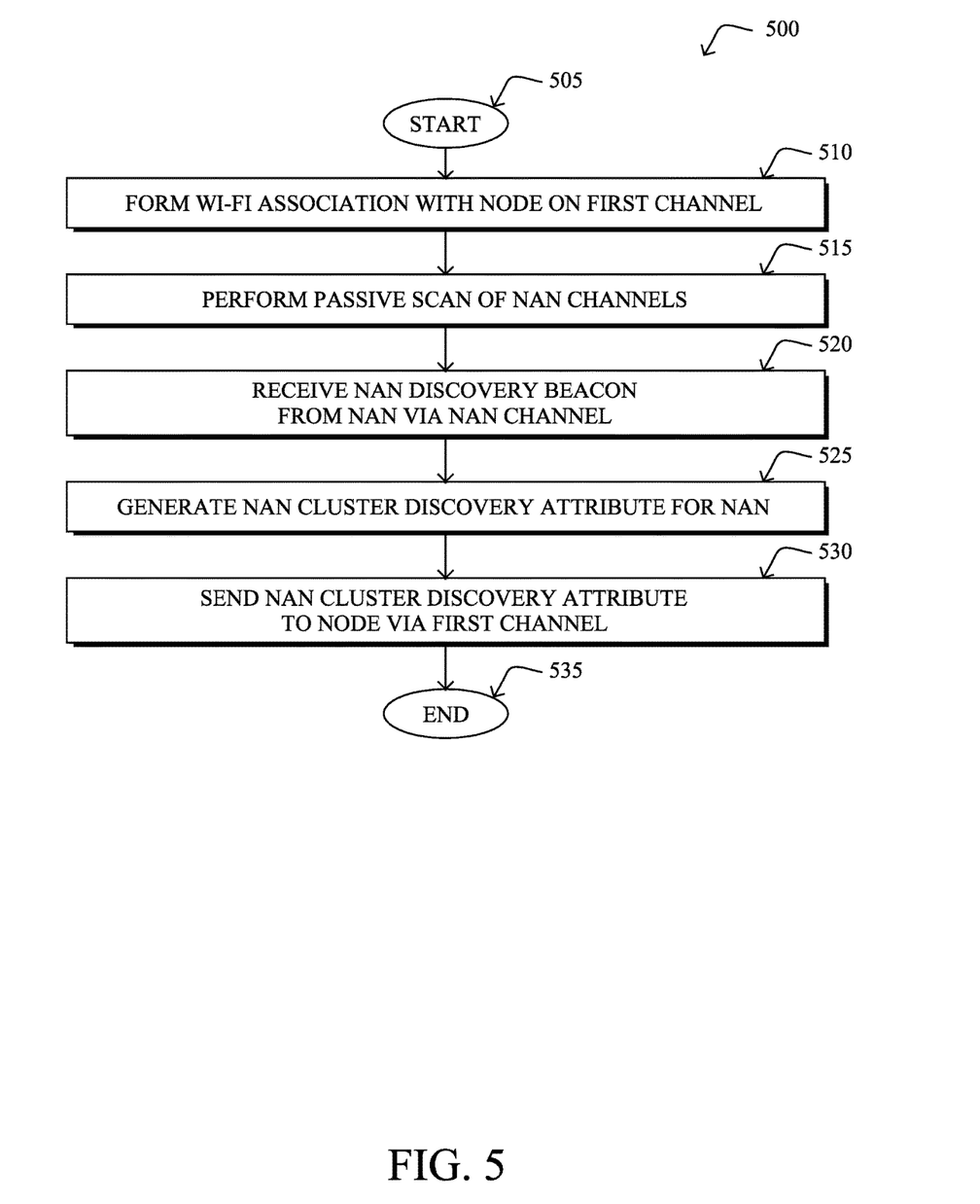
FIG. 5 illustrates a simplified procedure for discovering a NAN.

FIG. 5 illustrates an example simplified procedure for discovering a NAN in a network in accordance with one or more embodiments described herein. For example, a non-generic, specifically configured device (e.g., device 200) may perform procedure 500 by executing stored instructions (e.g., NAN discovery process 248). The procedure 500 may start at step 505, and continues to step 510, where, as described in greater detail above, a networking device in a network forms a Wi-Fi association with a node on a first wireless channel. The networking device may be, for example, a wireless AP. The first wireless channel may be any channel on which both the networking device and the node can communicate.

In step 515, the networking device may perform a passive scan of NAN channels. As described in greater detail above, the networking device may scan any of the channels, looking for a broadcast message from a node that is a member of a NAN in the vicinity.

In step 520, as described in greater detail above, the networking device may receive a NAN discovery beacon from a NAN via a particular one of the NAN channels during the passive scan. For example, the particular NAN channel may comprise at least one of: Wi-Fi channel 6 in the 3.4 GHz band or Wi-Fi channel 44 or 149 in the 5 GHz band. In some embodiments, the particular channel is different than the channel on which the networking device is associated with the node. The networking device may receive discovery beacons from a plurality of NANs and/or NAN clusters.

In step 525, as described in greater detail above, the networking device may generate a NAN cluster discovery attribute for the NAN based on the received NAN discovery beacon. Discover attributes may indicate a service offered by the NAN, a wireless channel used by the NAN, or other features identifying the NAN and member nodes.

In step 530, the networking device may send the NAN discovery attribute to the node via the first channel. As described in greater detail above, the node may use passive or active scanning using the first channel. For example, the node may send a NAN probe request via the first channel, and the networking device may send a probe response including the NAN discovery attribute. The networking device may, in some embodiments, send a plurality of NAN discovery attributes for a plurality of NANs to the node. The node may use these attributes to select a suitable NAN to join. Procedure 500 then ends at step 535.

It should be noted that while certain steps within procedure 500 may be optional as described above, the steps shown in FIG. 5 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, leverage the association between a node, such as an IoT device, and a networking device (e.g., a wireless AP) to discover a NAN available for the node. By allowing the Wi-Fi AP scan and discover all available NAN networks and provide NAN attributes to the node on its associated channel, the work of NAN discovery is offloaded from a node often too constrained by power availability. User equipment devices (e.g., smartphones and personal computers) can quickly discover available NAN networks without changing their radio channels to scan in NAN designated channels. This significantly minimizes connectivity disruption on the user devices and can also potentially improve battery life.

While there have been shown and described illustrative embodiments that provide for NAN discovery by networking devices, it is to be understood that various other adaptations and modifications may be made within the spirit and scope of the embodiments herein. For example, while certain embodiments are described herein with respect to using certain types of user equipment, other Wi-Fi capable devices may also benefit from the techniques described herein. In addition, while certain protocols are shown, such as Wi-Fi Aware, other suitable wireless protocols may also be used.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments is herein.

What is claimed is:

1. A method comprising:
   forming, by a wireless access point device in a network, a Wi-Fi association with a user equipment device on a first wireless channel;
   performing, by the wireless access point device, a passive scan of Wi-Fi Neighbor Awareness Network (NAN) channels to discover one or more available NANs for the user equipment to associate with;
   receiving, at the wireless access point device, a NAN discovery beacon from a NAN via a particular one of the NAN channels during the passive scan;
   generating, by the wireless access point device, a NAN cluster discovery attribute for the NAN based on the received NAN discovery beacon; and
   sending, by the wireless access point device, the NAN cluster discovery attribute to the user equipment device via the first wireless channel, wherein the user equipment device uses the NAN cluster discovery attribute to associate with the NAN.

2. The method as in claim 1, wherein the particular NAN channel comprises at least one of: Wi-Fi channel 6 in the 2.4 GHz band, Wi-Fi channel 44 in the 5 GHz band, or channel Wi-Fi 149 in the 5 GHz band.

3. The method as in claim 1, further comprising:
   receiving, at the wireless access point device, a NAN probe request from the user equipment device via the first wireless channel, wherein the NAN cluster discovery attribute is sent to the user equipment device via the first wireless channel based on the received probe request.

4. The method as in claim 1,
   wherein the user equipment device associates with the NAN using a different channel than that of the first wireless channel.

5. The method as in claim 1, wherein sending the NAN cluster discovery attribute to the user equipment device via the first wireless channel comprises:
sending, by the wireless access point device, a plurality of NAN cluster discovery attributes for a plurality of NANs to the user equipment device.

6. The method as in claim 1, wherein the NAN cluster discovery attribute indicates at least one of:
a service offered by the NAN or a wireless channel used by the NAN.

7. The method as in claim 1,
wherein the NAN is a NAN cluster comprising a plurality of user equipment devices.

8. An apparatus comprising:
one or more network interfaces to communicate with a network;
a processor coupled to the network interfaces and configured to execute one or more processes; and
a memory configured to store a process executable by the processor, the process when executed configured to:
form a Wi-Fi association with a user equipment device on a first wireless channel;
perform a passive scan of Wi-Fi Neighbor Awareness Network (NAN) channels to discover one or more available NANs for a user equipment device to associate with;
receive a NAN discovery beacon from a NAN via a particular one of the NAN channels during the passive scan;
generate a NAN cluster discovery attribute for the NAN based on the received NAN discovery beacon; and
send the NAN cluster discovery attribute to the user equipment device via the first wireless channel, wherein the user equipment device uses the NAN cluster discovery attribute to associate with the NAN,
wherein the apparatus comprises a wireless access point.

9. The apparatus as in claim 8, wherein the particular NAN channel comprises at least one of: Wi-Fi channel 6 in the 2.4 GHz band, Wi-Fi channel 44 in the 5 GHz band, or channel Wi-Fi 149 in the 5 GHz band.

10. The apparatus as in claim 8, wherein the process when executed is further operable to:
receive a NAN probe request from the user equipment device via the first wireless channel, wherein the NAN cluster discovery attribute is sent to the user equipment device via the first wireless channel based on the received probe request.

11. The apparatus as in claim 8,
wherein the user equipment device associates with the NAN using a different channel than that of the first wireless channel.

12. The apparatus as in claim 8, wherein the apparatus sends the NAN cluster discovery attribute to the user equipment device via the first wireless channel by:
sending a plurality of NAN cluster discovery attributes for a plurality of NANs to the user equipment device.

13. The apparatus as in claim 8, wherein the NAN cluster discovery attribute indicates at least one of:
a service offered by the NAN or a wireless channel used by the NAN.

14. The apparatus as in claim 8,
wherein the NAN is a NAN cluster comprising a plurality of user equipment devices.

15. A tangible, non-transitory, computer-readable medium storing program instructions that, when executed by a networking wireless access point device in a network, cause a networking device to perform a process comprising:
forming, by the wireless access point device, a Wi-Fi association with a user equipment device on a first wireless channel;
performing, by the networking device, a passive scan of Wi-Fi Neighbor Awareness Network (NAN) channels to discover one or more available NANs for the user equipment to associate with;
receiving, at the wireless access point networking device, a NAN discovery beacon from a NAN via a particular one of the NAN channels during the passive scan;
generating, by the wireless access point networking device, a NAN cluster discovery attribute for the NAN based on the received NAN discovery beacon; and
sending, by the wireless access point networking device, the NAN cluster discovery attribute to the user equipment device via the first wireless channel, wherein the user equipment device uses the NAN cluster discovery attribute to associate with the NAN.

16. The computer-readable medium as in claim 15, wherein the particular NAN channel comprises at least one of: Wi-Fi channel 6 in the 2.4 GHz band, Wi-Fi channel 44 in the 5 GHz band, or channel Wi-Fi 149 in the 5 GHz band.

17. The computer-readable medium as in claim 15,
wherein the user equipment device associates with the NAN using a different channel than that of the first wireless channel.

* * * * *

UNITED STATES PATENT AND TRADEMARK OFFICE
CERTIFICATE OF CORRECTION

PATENT NO. : 10,334,513 B2
APPLICATION NO. : 15/494633
DATED : June 25, 2019
INVENTOR(S) : Mahesh Satyanarayana et al.

Page 1 of 1

It is certified that error appears in the above-identified patent and that said Letters Patent is hereby corrected as shown below:

In the Specification

In Column 8, Line 32, please amend as shown:
embodiments herein.

Signed and Sealed this
Eighteenth Day of February, 2020

Andrei Iancu
*Director of the United States Patent and Trademark Office*